UNITED STATES PATENT OFFICE 2,108,723

METHOD OF PREPARING TiO₂

Reginald Hill Monk and Archibald Stewart Ross, Montreal, Quebec, Canada, assignors to American Zinc, Lead & Smelting Company, St. Louis, Mo., a corporation of Maine No Drawing. Application November 11, 1935, Serial No. 49,288

13 Claims. (Cl. 23—202)

This invention relates to the production of a substantially pure TiO₂ and has for its object to provide a practical and economical method for this purpose.

Heretofore the production of titanium dioxide has involved the use of certain hydrolytic methods which have been based upon several differing principles.

Titanium dioxide is usually derived from the solution obtained by the lixiviation of the cake prepared by the sulphation of various titaniferous ores, notably ilmenite and mixtures of ilmenite and rutile. Such solutions contain sulphates of titanium and iron, the latter being reduced to the ferrous state to further partial removal by crystallization and to maintain the remainder in solution during the hydrolysis of the titanium sulphate.

One of the hydrolytic methods referred to above consists in boiling a fairly dilute solution of titanium sulphate of low acid concentration. By this method complete hydrolysis is obtained only from solutions containing less than 1% TiO₂ and 0.5% free acid. Hydrolyses performed according to this method require prolonged boiling and give a product contaminated with iron oxide. This method is impractical in the preparation of a substantially pure TiO₂ and if the large volume of solution to be handled is diminished by increasing the concentration of the titanium sulphate the yield of TiO₂ is lowered greatly even with prolonged boiling.

Another method involves the boiling of a concentrated titanium sulphate solution in which hydrolysis is initiated by nuclei, either derived from preliminary hydrolysis of, or partial neutralization of, a small percentage of the titanium salt solution itself, or added in the form of some foreign substance. This is the so-called "seeding" method. In all known "seeding" methods for the preparation of pure titanium dioxide, unless a permanently insoluble substance, which obviously must be limited to a small quantity is employed as seed, the titanium sulphate solution utilized as seed is a very small proportion of the bulk of the solution to be hydrolyzed. By this method an excellent product may be obtained, but the particle size of the product cannot readily be controlled, and the method is uneconomical in the matter of time consumed.

A third method also employs a concentrated titanium sulphate solution but depends upon a sudden change in the concentration, the pressure or the temperature of the titanium sulphate solution. This method has been utilized in a variety of ways according to the nature of the particular variable, (concentration, pressure, temperature) the change in which is to act as the initiator of the hydrolysis. The success of this method depends upon the formation, during the preliminary stages of the hydrolysis, of a sufficient number of minute particles of hydrated titanium dioxide which will survive the increasing tendency to re-solution as the acid concentration grows during the hydrolysis, which particles act as nuclei for the crystallization of the hydrated titanium dioxide derived from the remainder of the solution. Any method which depends upon the addition of a concentrated titanium sulphate solution to a volume of water belongs to this group, if the dilution of the concentrated solution upon its addition to the water is sufficient not only to initiate hydrolysis but also to permit its progress to completion.

According to the present invention the method of hydrolysis in the production of titanium dioxide from a concentrated titanium sulphate solution involves three interdependent and mutually supporting factors exercising their respective functions under the most favorable conditions. These are, first, the formation of a large quantity of hydrated titanium dioxide particles as seed, but with very slight dilution of the original titanium sulphate solution; second, the employment of a temporarily insoluble salt, to initiate the first stages of crystallization and thus form the "seed", which salt afterwards dissolves in the acid medium resulting from hydrolysis. The third influencing factor is the use of a colloidal substance and preferably a protective colloid or semi-colloid which prevents the aggregation of the "seed" particles of titanium dioxide already initiated by the temporarily insoluble salt, and also acts in an auxiliary manner by furthering the maintenance in solution of the iron salts.

As an example of the method employed under the present invention, there is prepared by lixiviation of sulphated cake of titaniferous ore a concentrated solution of titanium sulphate, which, after crystallization of a part of the ferrous sulphate contained in the solution, is of a specific gravity of approximately 1.35, and contains approximately 7.5% by weight of TiO₂ and 20% by weight of H₂SO₄ free and combined.

There is next prepared for the hydrolysis bath a solution containing 0.3% by weight of dextrin to which is added 0.4% by weight of a suitable salt. This salt must be of such a character that when dispersed in water it will remain undissolved for a sufficient length of time to afford nuclei upon which titanium dioxide may aggregate as hereinafter described, and will be hereinafter referred to as a temporarily insoluble salt. This temporarily insoluble salt may consist, for example, of aluminum combined with acid radicals possessing the properties above described, such as the fluoride or oxalate of aluminum, magnesium, tin, antimony, titanium, thorium, germanium, zinc or zirconium brought to a high degree of dispersion. Such dispersion may be obtained for example, from the double decomposition of salts of aluminum caused to take place in a solution of glycerine and dextrin. The salts so dispersed in a suitable medium provide minute nuclei which, while temporarily insoluble nevertheless dissolve readily on the appearance of the acid consequent upon the first formation of hydrated titanium dioxide that is to act as the seed material.

To 250 c. c. of this solution, containing dextrin and such temporarily insoluble salt, brought to a temperature of approximately 90° C., there is added under agitation and preferably at a uniform rate, during a period of approximately fifteen minutes, approximately 200 c. c. of the titanium sulphate solution containing 7.5% $TiO_2$. The temperature of this portion of the titanium sulphate solution may vary between 30° C. and 80° C.

Hydrolysis resulting from the combining of these two solutions produces a large number of hydrated titanium dioxide particles to serve as "seed", and there is then added very quickly approximately four times as much (800 c. c.) of the same titanium sulphate solution, also at the selected temperature. The whole is now raised rapidly to approximately 98° C., and maintained at that temperature under agitation until the dextrin is converted to soluble sugar, which should require from twenty to thirty minutes. This results in the complete hydrolysis of the titanium sulphate, and the precipitate obtained has a density and particle size determined mainly by the temperature selected for the bulk of the titanium sulphate solution, a high temperature giving a more dense precipitate of larger particle size, and conversely a lower temperature giving a more bulky precipitate of finer particle size.

The precipitate may now be washed free from soluble salts and sugar by means of acidulated water or otherwise.

If the precipitate has been treated with a salt of aluminum, a trace of a cobalt salt may be added to it after such treatment to form cobalt aluminate and to increase the brilliancy and improve the color of the pigment.

This method of procedure differs from any of the prior art methods mentioned above in that the concentration of the titanium sulphate solution is suddenly changed by dilution at two important and fundamental points, to wit, at the beginning of the hydrolysis when, during the formation of the "seed", a limited quantity of the original titanium sulphate solution is run into the bath containing the colloidal substance and the temporarily insoluble salt, and again when the bulk of the original titanium sulphate solution is added to the bath after the "seed" has been prepared.

The total dilution brought about is so moderate that in itself it does not permit of complete hydrolysis. Furthermore, the quality of the final precipitate is determined and controlled in the initial stages of the hydrolysis by means of a nuclear material possessing important properties. The conditions under which these nuclei of hydrated titanium dioxide are formed are such that the dilution in the formation of the nuclei or "seed" and the concentration of the colloid (with the presence of the temporarily insoluble salt to initiate hydrolysis) produce great numbers of such minute nuclei by the complete hydrolysis of this first added portion of the titanium sulphate solution. These nuclei while possessing the necessary approach to reversibility are yet of sufficiently developed particle size that they persist during the time intervening between the addition of the final bulk of the titanium sulphate solution and its decomposition by hydrolysis.

The important function of the temporarily insoluble salt deserves further elucidation. If hydrated titanium dioxide itself be used as a nuclear material the first particles grow to excessive size and occlude iron salts. The behavior of the temporarily insoluble salt is however quite different. The high concentration of protective colloid in the bath at the beginning of hydrolysis would without it cause the production of extremely minute particles of hydrated titanium dioxide. Since the surface area of the particles per unit of mass, as is well known, increases enormously with fineness of subdivision and the sorption is proportional to surface area, there is an optimum particle size determined by the permissible amount of sorption. This optimum particle size is obtained through the properties of the temporarily insoluble salt. For in the early stages of the preparation of the hydrated titanium dioxide which is used as seed for the remaining bulk of the titanium sulphate solution, the particles of the temporarily insoluble salt serve as nuclei on which the first-formed hydrated titanium dioxide particles can collect or aggregate so that their surface area and therefore, their sorption of iron salts is greatly reduced. The aggregates so formed would grow to undesirable magnitude and the seed would consist of particles of varying sizes were it not for the property characteristic of the temporarily insoluble salt of dissolving in the acid derived from the hydrolysis. Consequently, the aggregates first formed on the nuclei furnished by the temporarily insoluble salt disintegrate into smaller units which in turn furnish more nuclei. At the same time the solution of the salt increases the solvent action of the acid derived from hydrolysis upon both iron and titanium salts, the smallest particles of hydrated titanium dioxide with their corresponding large area per unit of mass, and the traces of iron hydroxides formed by oxidation during the hydrolysis. The net result of the presence of the temporarily insoluble salt in the beginning of the hydrolysis and its solution in the acid derived therefrom with the consequent disintegration of the large aggregates, is a better separation of a pure seed material, uniform in particle size from the other components of the hydrolyzing bath. The dissolved "temporarily insoluble salt" exercises its functions moreover throughout the duration of the hydrolysis but in lesser degree owing to its higher dilution when the bulk of the titanium sulphate solution has been added.

Thus it will be seen that a temporarily insoluble salt used to initiate crystallization exercises a totally different function from that of water-soluble salts such as the alkali fluorides and alkali oxalates and the organic acids. Such water-soluble salts have been added to the titanium sulphate solution prior to hydrolysis, and in a very dilute solution to the bath in which the hydrolysis of the whole titanium sulphate solution is caused to take place, but it has not heretofore been proposed to employ salts insoluble in water which, after exercising their primary function as initiators of crystallization, dissolve with the simultaneous attainment of a more highly dispersed seed (hydrated titanium dioxide) and one at the same time free from occluded or sorbed iron salts.

Moreover, while the precentage of the total of the titanium sulphate solution heretofore used as seed is only from 1% to 3%, the present invention employs as high as 20% of the titanium sulphate solution for this purpose, or from 10 to 20 times the quantity of such solution heretofore utilized as seed. Upon the sudden addition of the final portion of the titanium sulphate solution, the infinite number of nuclei of hydrated titanium dioxide formed under the present invention cause a more rapid and complete precipitation of the titanium dioxide and give a final product of uniform particle size free from either large aggregates or insufficiently developed particles. This is in marked contrast to the results secured from all processes in which the total hydrolysis is initiated by a small number of nuclei and in which the size of the particles of the hydrolysis product is strongly influenced by the relatively long time-interval during which the nuclei must persist while the titanium sulphate solution is being brought by heating to the degree of instability at which complete hydrolysis around these nuclei can take place.

The minute nuclei of hydrated titanium dioxide originated and maintained by the present invention promote the interchange between salt and hydrolysis product, inasmuch as the nuclei, though well developed, are yet small enough to possess an appreciable solubility so that the reaction is carried out under nearly reversible conditions. Consequently, a better separation of the hydrated titanium dioxide from the ferrous salt solution which constitutes the greater part of the liquid medium is attained.

At ordinary temperatures titanium sulphate in solution is in a meta-stable state, gradually decomposing to basic sulphate in the direction of the formation of a stable titanium dioxide and when the bulk of the titanium sulphate solution has been added to this large quantity of the hydrated titanium dioxide seed material, it follows that a slight change in pressure, concentration or temperature (in the example described above an increase in the temperature), brings the hydrolysis to a rapid completion.

While temporarily insoluble salts of aluminum have been specifically referred to in the above example it is to be understood that any temporarily insoluble salt may be used to initiate the first stages of crystallization, provided it afterwards dissolves in an acid medium to form a solvent of the required characteristics. Any such temporarily insoluble salts, such as those of magnesium, zinc, thorium or zirconium, are to be recognized as the equivalents of the insoluble salts of aluminum mentioned herein.

Having thus described the invention, what is claimed is:

1. In a process of preparing titanium dioxide by hydrolysis of a titanium salt solution, the step of progressively adding, under agitation, a portion of the titanium salt solution maintained at a temperature below that of hydrolysis, to a bath maintained at a hydrolyzing temperature and containing an aqueous and approximately neutral dispersion of a protective colloid and a salt relatively insoluble in said aqueous dispersion but completely soluble in the acid medium resulting from hydrolysis.

2. In a process of preparing titanium dioxide by hydrolysis of a titanium salt solution, the step of progressively hydrolyzing a portion of the titanium salt solution by slowly adding said portion under agitation over a period of approximately fifteen minutes and at a temperature below that of hydrolysis to a volume of water not substantially less than that of the added titanium salt solution and maintained at a temperature of approximately 90° C., and containing an aqueous and approximately neutral dispersion of a protective colloid and a salt relatively insoluble in said aqueous dispersion but completely soluble in the acid medium resulting from hydrolysis.

3. In a process of preparing titanium dioxide, the steps of preparing a bath containing an aqueous and approximately neutral dispersion of a protective colloid and a salt relatively insoluble in said aqueous dispersion but completely soluble in the acid medium resulting from hydrolysis, preparing a titanium salt solution of a specific gravity of approximately 1.3, and then progressively hydrolyzing a portion of said titanium salt solution by adding said portion under agitation to said bath progressively during a period of approximately fifteen minutes, the temperature of said added portion before the addition being below that of hydrolysis, the volume of said added portion of titanium salt solution being substantially no larger than that of said bath, and maintaining the temperature of the bath at approximately 90° C., whereby the semi-colloidal precipitate of hydrated titanium dioxide is stabilized in the presence of the free acid resulting from the hydrolysis of the titanium salt solution.

4. In a process of preparing titanium dioxide, the steps of preparing a bath containing an aqueous and approximately neutral dispersion of a protective colloid and a salt relatively insoluble in the said aqueous dispersion but completely soluble in the acid resulting from hydrolysis, preparing a titanium salt solution of a specific gravity of approximately 1.3, and then progressively hydrolyzing a portion of said titanium salt solution by adding said portion under agitation to said bath progressively during a period of approximately fifteen minutes, said added portion being at a temperature below that of hydrolysis, the volume of said added portion of titanium salt solution being substantially no larger than that of said bath, and maintaining the temperature of said bath during said addition at approximately 90° C., whereby the semi-colloidal "seed" material of hydrated titanium dioxide produced is stabilized and persists in the presence of the free acid resulting from the hydrolysis of the titanium salt solution.

5. In a process of preparing titanium dioxide by hydrolysis of a titanium salt solution, the steps of dispersing in a volume of water a member of that group of salts relatively insoluble in water but soluble in acids and consisting of the fluorides and oxalates of tin, antimony, titanium, thorium, aluminum, germanium, zinc and zirconium, together with a member of that group of substances consisting of protective colloids and semi-colloids, and then introducing into said volume of water a titanium salt solution not substantially greater in volume than said volume of water, whereby there are provided nuclei for the hydrated titanium dioxide liberated by the hydrolysis of the said titanium salt solution.

6. In a process of preparing titanium dioxide, the steps of forming an aqueous and approximately neutral dispersion of a protective colloid and a salt relatively insoluble in water but completely soluble in the aqueous medium resulting from hydrolysis, and then adding a concentrated titanium salt solution thereto.

7. In a process of preparing titanium dioxide, the steps of forming a dispersion of aluminum oxalate and a protective colloid in water, and then adding a concentrated titanium salt solution thereto.

8. In a process of preparing titanium dioxide, the steps of forming a dispersion of zinc fluoride and a protective colloid in water, and then adding a concentrated titanium salt solution thereto.

9. In a process of preparing titanium dioxide, the steps of forming a dispersion of zinc oxalate and a protective colloid in water, and then adding a concentrated titanium salt solution thereto.

10. In a process of preparing titanium dioxide, the steps of preparing an aqueous and approximately neutral dispersion of a protective colloid and a salt relatively insoluble in said aqueous dispersion but completely soluble in the acid resulting from hydrolysis, then slowly adding thereto a small quantity of a concentrated titanium salt solution, under agitation, and then quickly adding a larger volume of the concentrated titanium salt solution.

11. In a process of preparing titanium dioxide, the step of adding a titanium salt solution to a stabilized seed suspension prepared by hydrolysis of a smaller quantity of the same solution in the presence of an aqueous and approximately neutral dispersion of a protective colloid and a salt relatively insoluble in said aqueous dispersion but completely soluble in the acid medium resulting from hydrolysis.

12. In a process of preparing titanium dioxide, the step of adding a titanium salt solution to a stabilized seed suspension prepared by hydrolysis of a smaller quantity of the same solution in the presence of an aqueous and approximately neutral dispersion of a protective colloid and a salt relatively insoluble in said aqueous dispersion but completely soluble in the acid medium resulting from hydrolysis and heating, with agitation, the mixture to approximately 98° C. to effect complete hydrolysis of the titanium salt.

13. In a process of preparing titanium dioxide, the steps of adding, under agitation, a titanium salt solution at a temperature below that of hydrolysis and of a specific gravity of approximately 1.3 to a stabilized seed suspension prepared by hydrolysis of a smaller volume of titanium salt solution in the presence of an aqueous and approximately neutral dispersion of a protective colloid and a salt relatively insoluble in said aqueous dispersion but completely soluble in the acid medium resulting from hydrolysis and heating with agitation, the mixture to approximately 98° C., to effect complete hydrolysis of the titanium salt.

14. In a process of preparing titanium dioxide by hydrolysis of a titanium salt solution, the steps of forming a bath containing an aqueous and approximately neutral dispersion of a protective colloid and a salt relatively insoluble in said aqueous dispersion but completely soluble in the acid medium resulting from hydrolysis, maintaining said bath at hydrolyzing temperature, and then progressively adding to said bath a portion of the titanium salt solution having a temperature below that of hydrolysis said addition being at a rate at which approximately complete hydrolysis takes place.

15. In a process of preparing titanium dioxide by hydrolysis of a titanium salt solution, the steps of forming a bath containing an aqueous and approximately neutral dispersion of a protective colloid and a salt relatively insoluble in said aqueous dispersion but completely soluble in the acid medium resulting from hydrolysis, maintaining said bath at hydrolyzing temperature, progressively adding to said bath a small portion of the titanium salt solution having a temperature below that of hydrolysis, said addition being at a rate at which approximately complete hydrolysis takes place, then quickly adding to the bath a large bulk of the titanium salt solution having a temperature below that of hydrolysis, and then raising the temperature to a degree sufficient to complete hydrolysis.

16. In a process of preparing titanium dioxide by hydrolysis of a titanium salt solution, the step of hydrolyzing a portion of the titanium salt solution in the presence of an aqueous and approximately neutral dispersion of a protective colloid and a salt relatively insoluble in said aqueous dispersion but completely soluble in the acid medium resulting from hydrolysis.

17. In a process of preparing titanium dioxide by hydrolysis of a titanium salt solution, the step of hydrolyzing a portion of the titanium salt solution in the presence of an aqueous and approximately neutral dispersion of a protective colloidal substance and a salt of aluminum relatively insoluble in said aqueous dispersion but completely soluble in the acid resulting from hydrolysis.

18. In a process of preparing titanium dioxide by hydrolysis of a titanium salt solution, the step of hydrolyzing a portion of the titanium salt solution in the presence of an aqueous and approximately neutral dispersion of a protective colloidal substance and a salt of zinc relatively insoluble in said aqueous dispersion but completely soluble in the acid resulting from hydrolysis.

REGINALD HILL MONK.
ARCHIBALD STEWART ROSS.